(No Model.)
M. LEVY & H. L. BELL.
PHOTOGRAPHIC PLATE HOLDER.
No. 552,766. Patented Jan. 7, 1896.
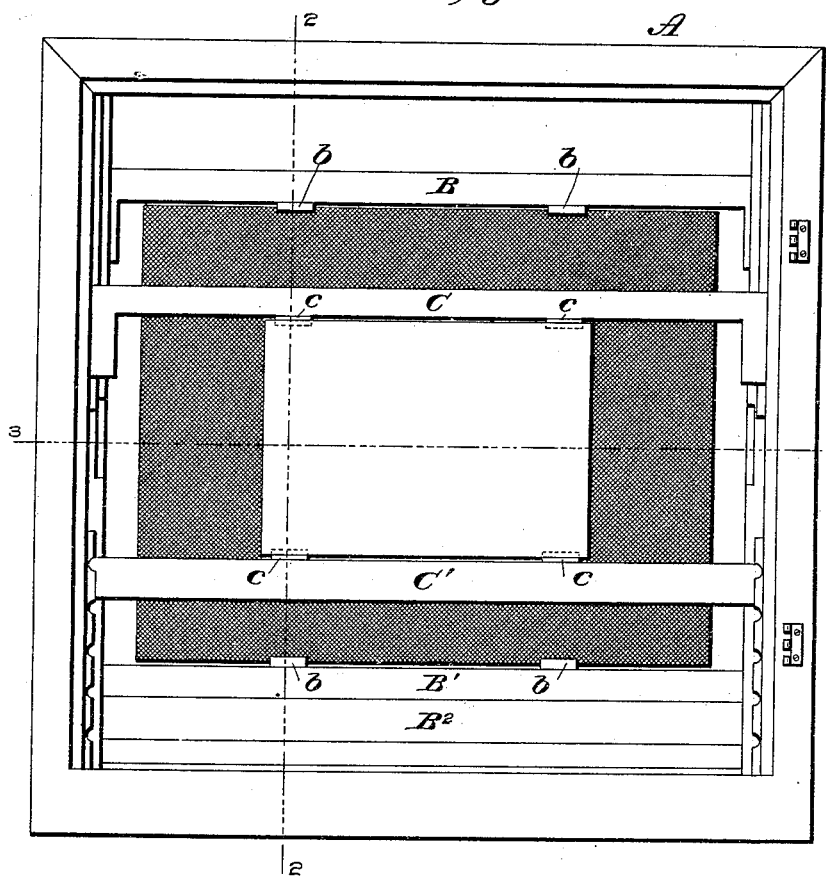
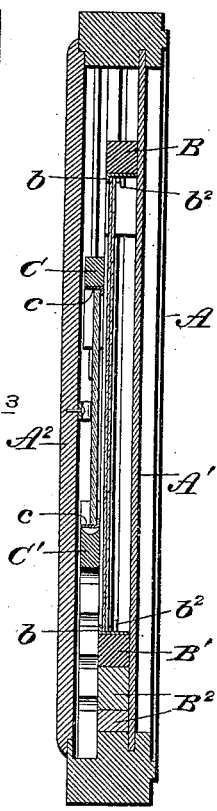
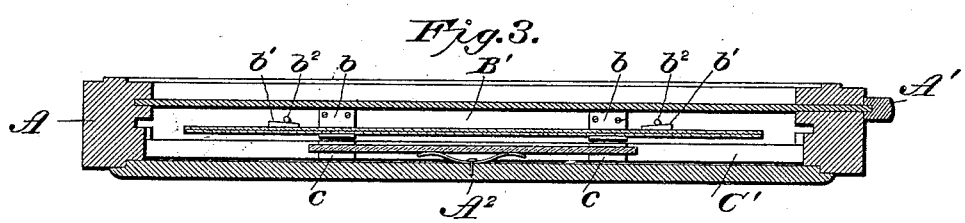
WITNESSES
Max Levy,
Harry L. Bell
INVENTORS
by
Attorney

UNITED STATES PATENT OFFICE.

MAX LEVY AND HARRY L. BELL, OF PHILADELPHIA, PENNSYLVANIA, ASSIGNORS TO SAID LEVY.

PHOTOGRAPHIC-PLATE HOLDER.

SPECIFICATION forming part of Letters Patent No. 552,766, dated January 7, 1896.

Application filed January 18, 1894. Serial No. 497,277. (No model.)

*To all whom it may concern:*

Be it known that we, MAX LEVY and HARRY L. BELL, citizens of the United States of America, residing at Philadelphia, in the county of Philadelphia and State of Pennsylvania, have invented certain new and useful Improvements in Plate-Holders for Cameras; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in plate-holders for cameras; and it consists in a plate-holder having means for holding therein a sensitive plate and a grating or screen such as is used in making photomechanical engravings.

One of the objects of the invention is to provide a plate-holder which will hold the grating or screen fixed at a predetermined distance in front of the sensitive plate, the plate-holder being so constructed that it can be used with only the sensitive plate by removing the grating or screen therefrom, and when it is used in connection with the grating or screen sensitive plates of different sizes can be held in proper position.

In the accompanying drawings, Figure 1 is a rear elevation of a screen plate-holder constructed to carry out our invention. Fig. 2 is a sectional view on the line 2 2 of Fig. 1, and Fig. 3 is a sectional view on the line 3 3 of Fig. 1.

A designates the frame, which is provided with the usual slide A' and hinged door $A^2$. The side pieces of the frame are provided with grooves or recesses, which are adapted to receive the screen-clamping bars B and B', which slide vertically in the grooves, the upper bar B having means for retaining the same in frictional contact with the side pieces of the frame, such being preferably accomplished by an ordinary flat spring. The bars B and B' are provided on their adjoining faces with metallic plates $b$ $b$, which have projecting flanges, said plates being screwed or otherwise attached to the bars, and against the flanges the ruled grating or screen is adapted to bear. The grating or screen is held against the flanges by means of wedges $b'$, which engage therewith and with pins $b^2$ carried by the bars B and B'.

$B^2$ designates strips which may be passed into the groove in which the bar B' slides and are adapted to locate said bar at the proper height or position in the frame.

It will be noted that the flanges of the metallic plates $b$ are at the side of the bars adjoining the sensitive plate, and though we prefer to hold the screen so that it will be positioned in the frame at a definite distance from the sensitive plate the construction hereinbefore described provides means for varying the distance, as pieces of paper may be placed between the grating or screen and the flanges $b$. Such adjustment is desirable, as it provides means for supporting the grating or screen so that it can be adjusted to and from the sensitive plate, according to the character of the work or subject it is desired to copy.

C and C' designate the bars which retain the sensitive plate in position behind the screen, and these bars are susceptible of vertical adjustment, so that plates of different sizes may be held parallel with the grating or screen. The flanged metallic plates $c$ carried by the bars C and C' are preferably made of silver, especially when wet plates are to be used, and the bar C' may be grooved to receive the drippings from the plate. The bar C' is provided with projections, which engage with recesses in strips attached to the side pieces of the frame, so that it can be adjusted in the frame and readily removed therefrom, and the upper bar may be provided with means for causing frictional contact of the same with the strips against which it bears. The strips are cut away at a suitable point, as at $c'$, to permit the insertion of the bars B and B', which hold the grating or screen.

The door $A^2$ is provided with a spring $a^2$, which bears against the sensitive plate and holds the same in position when the said door is closed.

Other means than those shown can be employed for adjusting the bars which hold the sensitive plate.

A screen plate holder constructed as hereinbefore described obviates the objections incident to plate-holders ordinarily used, and there is no liability of the sensitive plate and grating or screen coming in contact with each other or the drippings of the wet plate being deposited upon the grating or screen, as the gratings or screens of the most approved construction are sealed with balsam, and the solution on the sensitive plate is of such a nature that it is liable to be absorbed by the balsam, which results in the destruction of the screen. It should also be noted that the grating or screen is held at a fixed or definite distance from the sensitive plate, the distance being determined by the thickness of the screen or by the number of lines thereon to the inch. This screen plate-holder dispenses with the expensive and troublesome use of a number of frames, as the bars are readily adjustable for different-sized plates and screens.

Having thus described our invention, what we claim as new, and desire to secure by Letters Patent, is—

1. In a camera plate-holder, the combination with the usual means for supporting the sensitive plate, of a separate means for supporting a lined screen at a fixed and definite distance therefrom, said means of support consisting of adjustable bars sliding in grooves parallel with the face of the sensitive plate, and said adjustable bars being supplied with metallic flanges and suitable means for holding the screen against the flanges so that the distance between the sensitive plate and lined screen can be varied, in the manner and for the purpose described.

2. In a plate-holder, the combination, of means for holding a sensitive plate and bars for supporting a screen or grating, substantially as shown, whereby the screen or grating is held at a fixed distance in front of the sensitive plate and parallel therewith, the holding means for the screen or grating embodying a device for varying the distance between the sensitive plate and the screen, substantially as described.

3. In a plate-holder for cameras, the combination, of suitable supporting bars having means for engaging with a ruled grating or screen, and wedges for clamping said grating or screen against its engaging means, together with bars having metallic flanges which are adapted to engage with the sensitive plate, substantially as shown, whereby the sensitive plate and screen are held at a fixed distance and out of engagement with each other.

4. In a screen plate-holder for cameras, the combination of movable bars for clamping the sensitive plate, clamping bars for the grating or screen having flanged metallic plates and pins or projections, and wedges which are adapted to be inserted between the pins or projections and the grating or screen, for the purpose set forth.

5. In a plate holder, the combination, of a pair of bars or supports provided with means for supporting the plate at the edges fitted to said bars or supports so as to be capable of adjusting the plate relatively to the front of the plate holder, substantially as specified.

6. In a plate holder, the combination, of a pair of bars or supports for a plate holder, means for grasping the plate at the edges, a plate carrying these means and a slide adjusting the latter relatively to the front of the plate holder, substantially as specified.

7. In a plate holder, the combination, of means for holding a sensitive plate said means being vertically adjustable in the plate holder, of bars for supporting a screen or grating, said bars being adjustable in the plate holder, substantially as shown, whereby a grating or screen and a sensitive plate may be held in the plate holder adjacent to each other, the parts being so constructed that the sensitive plate and screen may be of different sizes, substantially as shown.

In testimony whereof we affix our signatures in presence of two witnesses.

MAX LEVY.
HARRY L. BELL.

Witnesses:
F. ERMANN,
A. HAUSSER.